United States Patent
Hasegawa

(10) Patent No.: US 10,371,264 B2
(45) Date of Patent: Aug. 6, 2019

(54) FLUID CONTROL VALVE

(71) Applicant: MITSUBISHI ELECTRIC CORPORATION, Tokyo (JP)

(72) Inventor: Satoru Hasegawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 152 days.

(21) Appl. No.: 15/505,896

(22) PCT Filed: Oct. 31, 2014

(86) PCT No.: PCT/JP2014/079104
§ 371 (c)(1),
(2) Date: Feb. 22, 2017

(87) PCT Pub. No.: WO2016/067464
PCT Pub. Date: May 6, 2016

(65) Prior Publication Data
US 2018/0238454 A1    Aug. 23, 2018

(51) Int. Cl.
| F16K 1/226 | (2006.01) |
| F16K 41/04 | (2006.01) |
| F16J 15/3268 | (2016.01) |
| F02M 26/67 | (2016.01) |
| F16J 15/3276 | (2016.01) |
| F02M 26/54 | (2016.01) |

(52) U.S. Cl.
CPC .......... F16K 1/2268 (2013.01); F02M 26/67 (2016.02); F16J 15/3268 (2013.01); F16J 15/3276 (2013.01); F16K 41/046 (2013.01); F02M 26/54 (2016.02)

(58) Field of Classification Search
CPC ....... F02M 26/67; F16K 1/224; F16K 1/2261; F16K 1/2268; F16K 41/046; F16J 15/3268; F16J 15/3276
See application file for complete search history.

(56) References Cited

U.S. PATENT DOCUMENTS

| 3,536,092 A * | 10/1970 | Mills ...................... F16K 1/425 |
| | | 137/329.02 |
| 3,911,948 A * | 10/1975 | Collins, Jr. ............ G05D 16/02 |
| | | 137/505.11 |
| 7,429,028 B2 * | 9/2008 | Tanaka ................. F16J 15/3228 |
| | | 251/214 |
| 2001/0035009 A1 | 11/2001 | Nakayasu et al. |
| 2005/0082507 A1 | 4/2005 | Tanaka et al. |

(Continued)

FOREIGN PATENT DOCUMENTS

| JP | 2001-342828 A | 12/2001 |
| JP | 2005-120932 A | 5/2005 |

(Continued)

*Primary Examiner* — Robert K Arundale
(74) *Attorney, Agent, or Firm* — Birch, Stewart, Kolasch & Birch, LLP

(57) ABSTRACT

A fluid control valve includes a seal member. The seal member includes a cylindrical portion and a flange portion. The flange portion extends radially outward from one end of the cylindrical portion. A valve shaft is inserted in the cylindrical portion. The flange portion is supported between a filter and a plug in a state in which the flange portion is pressed against the plug.

6 Claims, 7 Drawing Sheets

(56) References Cited

U.S. PATENT DOCUMENTS

| | | | |
|---|---|---|---|
| 2010/0065026 A1* | 3/2010 | Watanuki | F02M 26/50 |
| | | | 123/568.11 |
| 2010/0206406 A1* | 8/2010 | Nakamura | F16K 1/2268 |
| | | | 137/544 |
| 2011/0094481 A1 | 4/2011 | Zui et al. | |
| 2012/0193562 A1* | 8/2012 | Takai | F02D 9/106 |
| | | | 251/214 |
| 2012/0313025 A1* | 12/2012 | Takai | F16K 27/0218 |
| | | | 251/313 |
| 2012/0326069 A1* | 12/2012 | Takai | F16K 1/222 |
| | | | 251/314 |
| 2013/0048895 A1* | 2/2013 | Hodebourg | F02D 9/04 |
| | | | 251/308 |

FOREIGN PATENT DOCUMENTS

| | | |
|---|---|---|
| JP | 4537556 B2 | 9/2010 |
| WO | WO 2010/018650 A1 | 2/2010 |
| WO | WO 2014/010017 A1 | 1/2014 |
| WO | WO 2014/054118 A1 | 4/2014 |

\* cited by examiner

FLUID CONTROL VALVE

TECHNICAL FIELD

The present invention relates to a fluid control valve that is to be disposed in a conduit in which a high temperature fluid, such as an engine exhaust gas, flows.

BACKGROUND ART

A valve disclosed in Patent Literature 1, for example, includes a seal member made of elastic material and having a donut shape. The seal member is provided to prevent a fluid in a conduit from leaking out through a clearance between a valve shaft and bearing. The bore of an inner diameter portion of the seal member is supported by the valve shaft. The seal member is arranged between the bearing and a plug that is disposed axially opposite the bearing.

When the fluid flows in the conduit to cause a difference in pressure between the inside and outside of the conduit, the seal member receives pressure from the side of the conduit. This pressure causes the seal member to move in an axial direction toward the plug and change its shape. As a result, the outer diameter portion of the seal member is pushed against the plug. Thereby, the inner diameter portion of the seal member and an outer circumferential surface of the valve shaft are in close contact with each other and are sealed together, and the outer diameter portion of the seal member and the plug are in close contact with each other and are sealed together. Consequently, it is possible to prevent the fluid from leaking out beyond the plug.

Patent Literature 2 discloses a valve having a bearing bushing for supporting a valve shaft. The bearing bushing has a sealing function to prevent an exhaust gas from leaking out through the periphery of the valve shaft. The bearing bushing is made of carbon material and has a cylindrical shape. An end surface of the bearing bushing is in contact with an end surface of the valve and is pushed by the end surface of the valve. Thereby, the leakage of the fluid is prevented.

Note that the valve disclosed in Patent Literature 2 is intended to be used in a high-temperature atmosphere. So, the valve and the valve shaft are made of titan material. Valves made of titan material provide good rotational slidability between the valve and the bearing bushing made of carbon material even in a high-temperature atmosphere.

CITATION LIST

Patent Literature

Patent Literature 1: Japanese Unexamined Patent Application Publication No. 2005-120932
Patent Literature 2: Japanese Unexamined Patent Application Publication No. 2001-342828

SUMMARY OF INVENTION

Technical Problem

In the prior art disclosed in Patent Literature 1, the seal member needs to be made of elastic material in order for the seal member to be elastically deformed in accordance with the pressure of the fluid. As the elastic material, high heat-resistant resin material such as polytetrafluoroethylene (PTFE) may be used up to its heat resistance temperature. However, such heat-resistant resin material cannot be used to a valve through which fluid having a temperature higher than the heat resistance temperature flows (700 degrees Celsius or more). For example, an exhaust gas recirculation valve, which is used in a system in which engine exhaust gas is circulated and returned to a gas intake side, sometimes deals with high temperature exhaust gas having a temperature about 700 degrees Celsius. In this case, it is difficult to apply resin materials to the valve, even if the resin materials are high heat-resistant. Although the PTFE is a high heat-resistant resin material, it starts degrading at a temperature over 250 degrees Celsius and decomposes at a temperature equal to or more than 350 degrees Celsius.

On the other hand, the valve disclosed in Patent Literature 2 can be used in the high-temperature atmosphere, because the bearing bushing of the valve, which serves as the seal member, is made of carbon material.

However, the valve disclosed in Patent Literature 2 requires a complicated mechanism for transmitting a force of a thrust spring to the valve, because the valve is pressed against the bearing bushing by biasing the valve toward the bearing bushing by the force of the thrust spring.

In addition, it is necessary to additionally prepare the spring for biasing the valve and provide an accommodation space for receiving the additional spring. Thus, there is concern that the number of components increases, and that the size of the valve is enlarged.

The present invention is made in order to solve the above-mentioned problems, and it is therefore an object of the present invention to provide a fluid control valve including a seal structure that can prevent high temperature fluid from leaking out with a simple configuration.

Solution to Problem

A fluid control valve in accordance with an aspect of the invention includes: a housing including a fluid passage; a valve provided in the housing and configured to open or close the fluid passage; a valve shaft for supporting the valve; a filter member disposed around the valve shaft and configured to filter fluid from the fluid passage; and a plug member disposed axially opposite the filter member. The fluid control valve further includes a seal member having a cylindrical portion, and a flange portion extending radially outward from one end of the cylindrical portion, wherein the valve shaft is inserted in the cylindrical portion, and the flange portion of the seal member is supported between the filter member and the plug member in a state in which the flange portion is pressed against the plug member.

Advantageous Effects of Invention

According to the present invention, it is possible to prevent a high temperature fluid from leaking out with a simple configuration.

DESCRIPTION OF EMBODIMENTS

Hereinafter, in order to explain the invention in more detail, embodiments of the invention will be explained with reference to the drawings.

Embodiment 1

Figure 1:
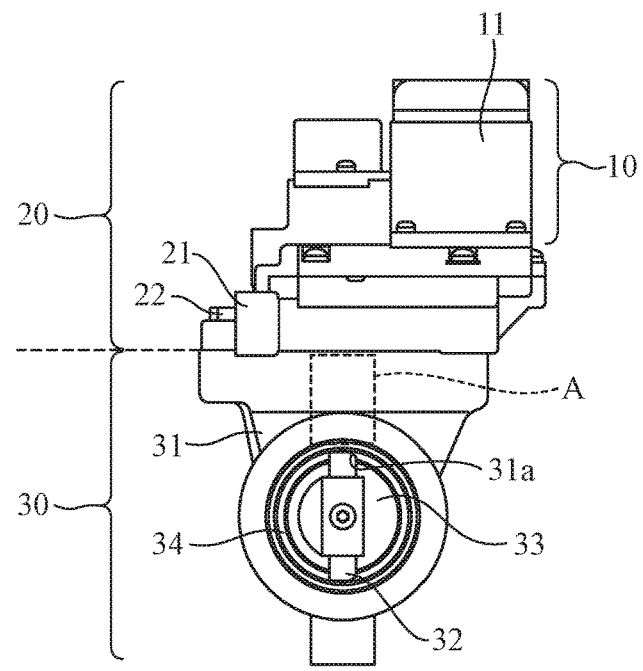
FIG. 1 is a diagram for illustrating a fluid control valve in accordance with Embodiment 1.

FIG. 1 is a diagram for illustrating a fluid control valve in accordance with Embodiment 1. In FIG. 1, the fluid control valve of Embodiment 1 is applied to an exhaust gas recirculation valve (hereinafter referred to as "EGR valve"), which is used in a system in which an engine exhaust gas is circulated and returned to the intake passage. The EGR valve shown in FIG. 1 is a valve of butterfly type. A valve 33 opens or closes an exhaust gas passage 34 by rotating with a valve shaft 32 integrally. As a configuration for rotating them, the fluid control valve includes an actuator unit 10, a driving force transmitting unit 20, and a valve unit 30.

The actuator unit 10 includes a motor 11, and generates a rotational driving force for opening or closing the valve 33. An output shaft of the motor 11 is connected to a gear mechanism disposed in the driving force transmitting unit 20.

The driving force transmitting unit 20 includes the gear mechanism and an actuator-side-housing 21 for accommodating the gear mechanism. The output shaft of the motor 11 and the valve shaft 32 are coupled to each other via the gear mechanism. Thus, the rotational driving force of the motor 11 is transmitted to the valve shaft 32 via the gear mechanism.

Note that the actuator-side-housing 21 is connected to a valve-side-housing 31 of the valve unit 30 with a bolt 22.

The valve unit 30 is connected to a conduit in which exhaust gas having high temperature flows, and controls a flow rate of the exhaust gas by opening or closing the valve 33. The valve-side-housing 31 constituting a part of the valve unit 30 is made of heat-resisting steel, such as cast iron or stainless steel. In the valve-side-housing 31, the exhaust gas passage 34 is provided.

In addition, in the valve-side-housing 31, a through-hole 31a is provided to communicate the exhaust gas passage 34 with the outside of the valve-side-housing 31. In the through-hole 31a, the valve shaft 32 is inserted.

Figure 2:
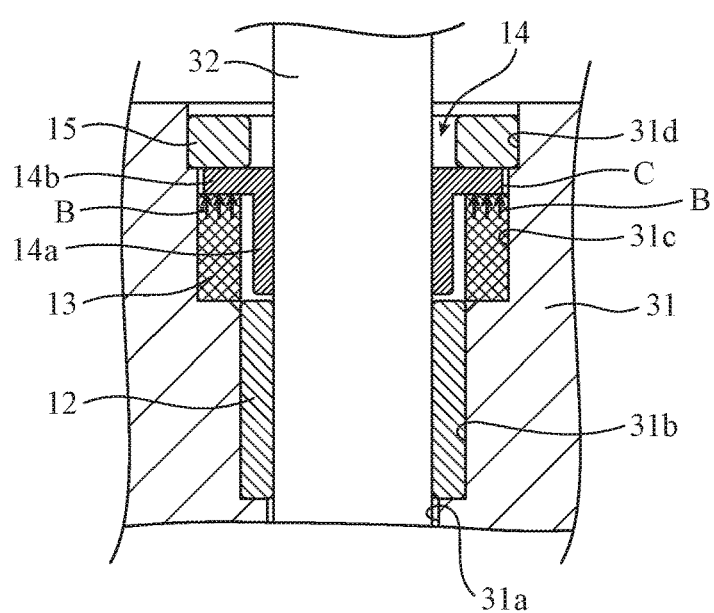
FIG. 2 is an enlarged cross-sectional view of a portion A of FIG. 1.
Figure 3:
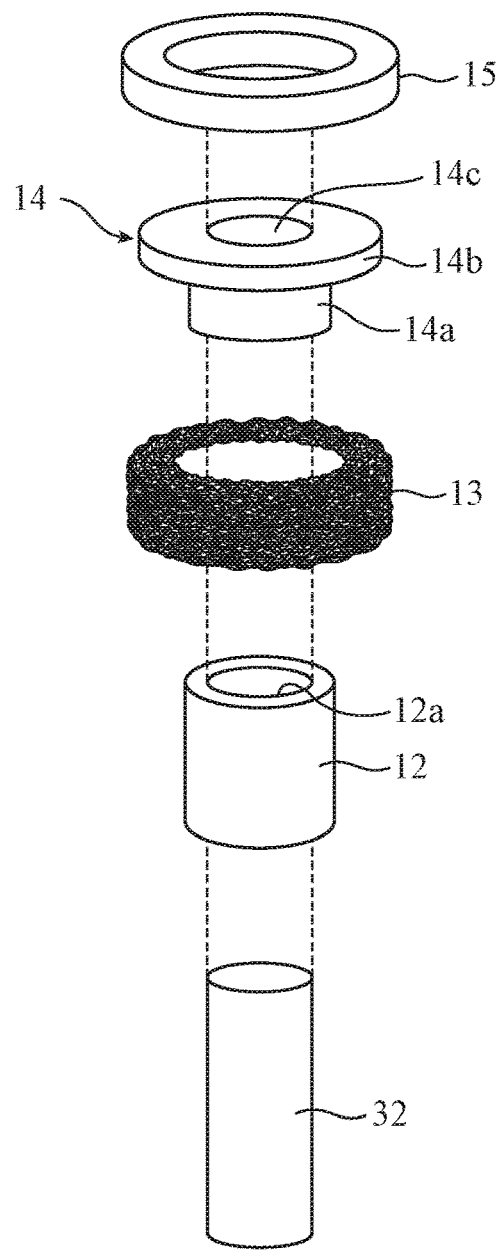
FIG. 3 is an exploded perspective view of a seal structure in accordance with Embodiment 1.

FIG. 2 is an enlarged cross-sectional view of a portion A of FIG. 1. FIG. 2 is the cross-sectional view of the portion A taken along an axial direction of the valve shaft. FIG. 3 is an exploded perspective view of a seal structure in accordance with Embodiment 1. In FIG. 3, each member, which constitutes the seal structure shown in FIG. 2, is illustrated. As shown in FIG. 2, in the valve-side-housing 31, bore portions 31b, 31c, and 31d are formed. The bore portions communicate with the through-hole 31a.

In the bore portion 31b, there is mounted a bearing bushing 12. The valve shaft 32 is inserted in the bearing bushing 12, and is rotatably supported by the inner circumferential surface 12a of the bearing bushing 12.

In the bore portion 31c, there are mounted a filter 13 and a seal member 14. The filter 13 is disposed around the valve shaft 32 in the bore portion 31c. The filter 13 filters the exhaust gas from the exhaust gas passage 34. The filter 13 removes foreign substances contained in the exhaust gas.

The filter 13 is a filter member having an elastic property such that a reaction force to return to an original state is produced when pushed. For example, as shown in FIG. 3, an annular filter which is made from thin metal wires, such as stainless steel wires, and has a sponge-like structure may be used.

The seal member 14 has a cylindrical portion 14a, and a flange portion 14b extending radially outward from one end of the cylindrical portion 14a. The seal member 14 seals the exhaust gas leaked from the exhaust gas passage 34 along the valve shaft 32. As shown in FIG. 2, the cylindrical portion 14a is disposed radially inward of the filter 13, and the valve shaft 32 is inserted in a through-hole 14c of the cylindrical portion 14a. The flange portion 14b is sandwiched between the filter 13 and a plug 15.

Note that the seal member 14 is made of material that is usable at a high temperature, for example, at a temperature equal to or more than 250 degrees Celsius. As the material that is usable at the high temperature, heat-resisting steel such as stainless steel is exemplified. In addition, the seal member 14 may be made of the same material as the valve shaft 32 in order to eliminate a difference in thermal expansion coefficient between the seal member 14 and the valve shaft 32.

The plug 15 is a member made of metal and has an annular shape as shown in FIG. 3. The filter 13 and the seal member 14 are supported within the bore portion 31c by press-fitting the plug 15 in the bore portion 31d. The plug 15 is made of heat-resisting steel such as stainless steel.

Note that the filter 13 has such a dimension along the axial direction of the valve shaft that an end face of the flange portion 14b is projected in the bore portion 31d before the plug 15 is placed in the bore portion 31d. That is, when the plug 15 is press-fitted in the bore portion 31d, the filter 13 is pushed by the plug 15 via the flange portion 14b. On the other hand, the flange portion 14b receives a reaction force B from the filter 13 because the filter 13 tries to return to its original shape after pushed by the plug 15. By this reaction force B, the flange portion 14b is pressed against the plug 15 and thereby supported between the filter 13 and the plug 15. The portion at which the flange portion 14b is pressed against the plug 15 in this manner serves as a seal portion that prevents the leakage of the exhaust gas. Since only the flange portion 14b of the seal member 14 is supported between the filter 13 and the plug 15, it is possible to save space of a support portion by thinning the flange portion 14b.

In addition to the seal portion above, the seal member 14 also prevents the gas leakage by gas flow resistivity, which is determined by both an axial length of the cylindrical portion 14a and a clearance between a surface defining the through-hole 14c and the valve shaft 32. Since the cylindrical portion 14a can be elongated along the axial direction regardless of the thickness of the flange portion 14b, it is possible to achieve sufficient gas flow resistivity at the cylindrical portion 14a and provide high sealing performance.

Under actual operating environments of the EGR valve, the clearance between the surface defining the through-hole 14c of the seal member 14 and the valve shaft 32 may vary due to, for example, a difference in the thermal expansion coefficient between the seal member 14 and the valve shaft 32. For example, when the clearance becomes smaller at a high temperature environment, the valve shaft 32 touches the inner wall of the through-hole 14c and may cause tightening which obstructs the rotation.

Accordingly, considering the operating environment of the EGR valve, a minimum clearance is chosen from a range of clearances that provides no tightening. Thereby, the gas leakage from the exhaust gas passage 34 can be prevented by the gas flow resistivity corresponding to the minimum clearance without obstructing the operation of the EGR valve.

Further, assuming that the seal member 14 is completely fixed to the bore portion 31c, there is a possibility that the rotation of the valve shaft 32 is obstructed when the valve shaft 32 comes into contact with the inner wall of the through-hole 14c of the seal member 14 during the operation of the EGR valve.

Accordingly, as shown in FIG. 2, the diameter of the flange portion 14b is determined such that a clearance C is provided between the flange portion 14b of the seal member 14 and the inner wall of the bore portion 31c. Thereby, the seal member 14 can move in a plane perpendicular to the axial direction of the valve shaft together with the valve shaft 32 by the distance defined by the clearance C, while the flange portion 14b is axially pushed against the plug 15. Consequently, the above-mentioned obstruction problem is not likely to occur.

In FIGS. 2 and 3, a case in which the cylindrical portion 14a of the seal member 14 is disposed on a filter-side (a side on which the filter 13 is arranged) is illustrated. However, embodiments are not limited to the illustrated arrangement. For example, the seal member 14 may be arranged upside down. That is, the seal member 14 may be arranged such that the cylindrical portion 14a is disposed on a plug-side (a side on which the plug 15 is arranged).

If the cylindrical portion 14a is disposed on the filter-side, the length of the cylindrical portion 14a in the axial direction is restricted. This is because the bearing bushing 12 is arranged on the filter-side as shown in FIGS. 2 and 3.

On the other hand, in the arrangement in which the cylindrical portion 14a is disposed on the plug-side, it is possible to make the cylindrical portion 14a long if no components are located axially close to the plug 15. Thereby, the gas flow resistivity is further increased and the sealing performance is improved.

As described above, according to Embodiment 1, the seal member 14 includes the cylindrical portion 14a, and the flange portion 14b extending radially outward from one end of the cylindrical portion 14a. Further, the valve shaft 32 is inserted in the cylindrical portion 14a. Moreover, the flange portion 14b is pressed against the plug 15 to be supported between the filter 13 and the plug 15.

Thus, the seal structure of the fluid control valve according to Embodiment 1 can be achieved with the seal member 14 having a simple configuration.

In addition, the seal member 14 can prevent the leakage of the fluid at the portion where the flange portion 14b is pressed against the plug 15, and by the gas flow resistivity at the cylindrical portion 14a. Thus, the seal member need not be elastically deformable to secure the sealing performance, and therefore can be used for high temperature fluid.

Moreover, the seal member 14 is axially supported in a space corresponding to the thickness of the flange portion 14b. So, by thinning the flange portion 14b, it is possible to save the space of the support portion.

Further, according to Embodiment 1, the cylindrical portion 14a of the seal member 14 is disposed on the side of the filter 13. With this configuration, the seal member 14 can prevent the leakage of the fluid at the portion where the flange portion 14b is pressed against the plug 15, and by the gas flow resistivity which is generated by the clearance between the cylindrical portion 14a and the valve shaft 32.

Alternatively, in Embodiment 1, the cylindrical portion 14a of the seal member 14 may be disposed on the side of the plug 15 rather than the side of the filter 13. Thereby, it is possible to make the cylindrical portion 14a long if no components are located axially close to the plug 15. Consequently, the gas flow resistivity is further increased and the sealing performance is improved.

Embodiment 2

Figure 4:
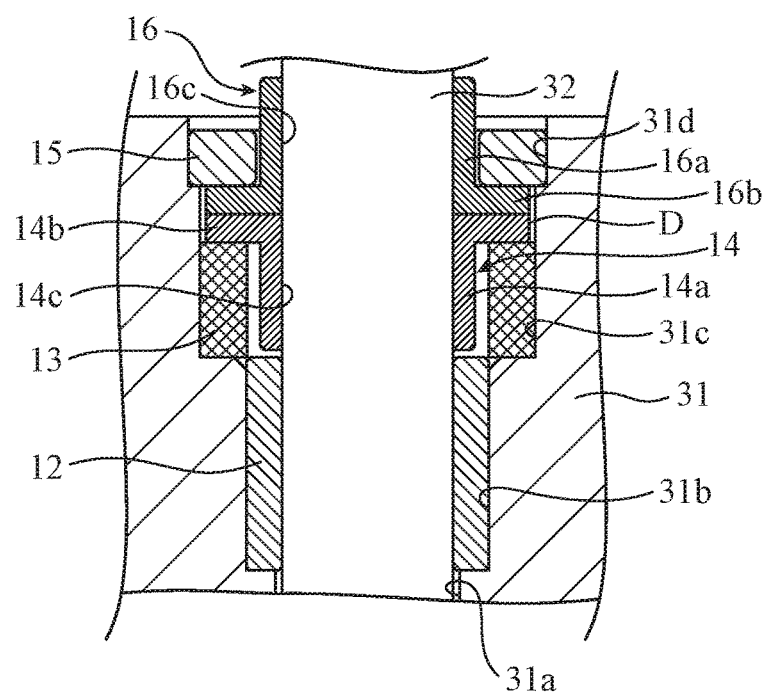
FIG. 4 is an enlarged cross-sectional view of a seal structure of a fluid control valve in accordance with Embodiment 2.
Figure 5:
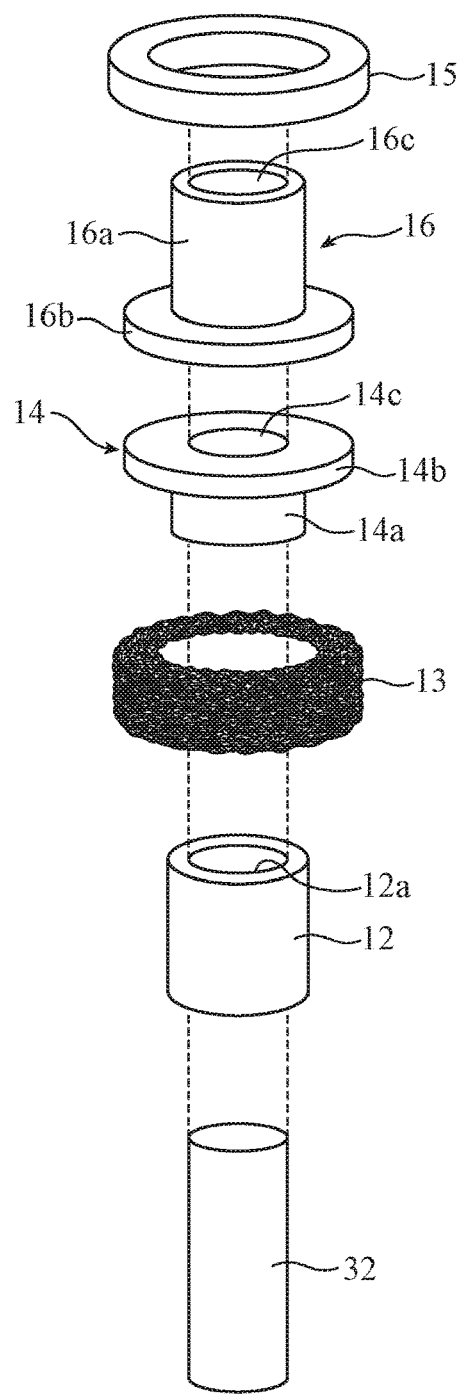
FIG. 5 is an exploded perspective view of the seal structure in accordance with Embodiment 2.

FIG. 4 is an enlarged cross-sectional view of a seal structure of a fluid control valve in accordance with Embodiment 2. The view is taken along the axial direction of a valve shaft in accordance with Embodiment 2, and shows a portion corresponding to the portion A illustrated in FIG. 1. FIG. 5 is an exploded perspective view of the seal structure in accordance with Embodiment 2, and shows members that constitute the seal structure shown in FIG. 4. As shown in FIG. 4, in a valve-side-housing 31, there are formed a through-hole 31a and bore portions 31b, 31c and 31d that communicate with the through-hole 31a.

In the bore portion 31b, there is mounted a bearing bushing 12. Inserted into the bearing bushing 12 is a valve shaft 32, which is rotatably supported by an inner circumferential surface 12a of the bearing bushing 12.

In the bore portion 31c, there are mounted a filter 13 and seal members 14, 16.

The seal member 14 is an example of a first seal member of this disclosure. A cylindrical portion 14a is disposed radially inward of the filter 13.

The seal member 16 is an example of a second seal member of this disclosure. The seal member 16 includes a cylindrical portion 16a, and a flange portion 16b extending radially outward from one end of the cylindrical portion 16a.

The cylindrical portion 16a of the seal member 16 is disposed radially inward of the plug 15, and the flange portion 16b is placed on the flange portion 14b of the seal member 14.

The valve shaft 32 is inserted in both a through-hole 14c of the cylindrical portion 14a and a through-hole 16c of the cylindrical portion 16a.

As in Embodiment 1, by press-fitting the plug 15 in the bore portion 31d, the filter 13 and the seal members 14, 16 are supported.

Note that the filter 13 has such a dimension along an axial direction of the valve shaft that an end face of the flange portion 16b is projected in the bore portion 31d before the plug 15 is placed in the bore portion 31d. That is, when the plug 15 is press-fitted in the bore portion 31d, the filter 13 is pushed by the plug 15 via the flange portions 16b, 14b. On the other hand, the flange portion 14b receives a reaction force from the filter 13 because the filter 13 tries to return to its original shape after pushed by the plug 15.

By this reaction force, the flange portions 14b, 16b are supported between the filter 13 and the plug 15 in a state in which the flange portion 16b is pressed against the plug 15.

Thus, a portion where the flange portion 16b is pressed against the plug 15 serves as a seal portion that prevents the leakage of the exhaust gas. Since the flange portions 14b, 16b of the seal members 14, 16 are supported between the filter 13 and the plug 15, it is possible to save space of a support portion by thinning at least one of the flange portions 14b and 16b.

In addition to the seal portion described above, the seal members 14, 16 prevent the gas leakage by gas flow resistivity, which is determined by axial lengths of the cylindrical portions 14a, 16a, a clearance between a surface defining the through-hole 14c and the valve shaft 32, and a clearance between a surface defining the through-hole 16c and the valve shaft 32.

While a minimum clearance that provides no tightening is provided between the valve shaft 32 and the inner walls of the through-holes 14c, 16c, the cylindrical portions 14a, 16a can be elongated axially regardless of the thickness of the flange portions 14b and 16b. Therefore, it is possible to achieve sufficient gas flow resistivity at the cylindrical portions 14a, 16a and provide high sealing performance.

Note that, as shown in FIG. 4, an axial length of a cylindrical portion 14a of the seal member 14 may be the same as an axial length of the cylindrical portion 16a of the seal member 16. In this case, a total axial length of the cylindrical portions becomes two times longer than the axial length of the cylindrical portion according to Embodiment 1. Thus, the gas flow resistivity is increased.

Alternatively, if no components are located axially close to the plug 15, the seal member 16 may have a longer cylindrical portion 16a than the cylindrical portion 14a. Thereby, the gas flow resistivity at the cylindrical portions 14a, 16a is further increased and the sealing performance is improved.

Further, assuming that the seal members 14, 16 are completely fixed to the bore portion 31c, there is a possibility that the rotation of the valve shaft 32 is obstructed when the valve shaft 32 comes into contact with the inner walls of the through-holes 14c, 16c during the operation of the EGR valve.

Accordingly, as shown in FIG. 4, diameters of the flange portions 14b, 16b are determined such that a clearance D is provided between the flange portions 14b, 16b and an inner wall of the bore portion 31c.

Thereby, the seal member 14 can move in a plane perpendicular to the axial direction of the valve shaft together with the valve shaft 32 by the distance defined by the clearance D, while the flange portion 14b is axially pushed against the flange portion 16b. Similarly, the seal member 16 can move in a plane perpendicular to the axial direction of the valve shaft together with the valve shaft 32 by the distance defined by the clearance D, while the flange portion 16b is axially pushed against the plug 15. Consequently, the above-mentioned obstruction problem is not likely to occur.

As described above, according to Embodiment 2, the seal members 14, 16 respectively include the cylindrical portions 14, 16, and the flange portions 14b, 16b extending radially outward direction from one end of the cylindrical portions 14a, 16a. The valve shaft 32 is inserted in both the cylindrical portion 14a and the cylindrical portion 16a.

The cylindrical portion 14a of the seal member 14 is disposed on the side of the filter 13, and the cylindrical portion 16a of the seal member 16 is disposed on the side of the plug 15. The flange portions 14b, 16b are supported between the filter 13 and the plug 15 in a state in which the flange portion 16b is pressed against the plug 15.

Thus, the seal structure of the fluid control valve according to Embodiment 2 can be achieved with the seal members 14, 16 each having a simple configuration.

In addition, the seal members 14, 16 can prevent the leakage of the fluid at the portion where the flange portion 16b is pressed against the plug 15, and by the gas flow resistivity at the cylindrical portions 14a, 16a.

Thus, the seal member need not be elastically deformable to secure the sealing performance, and therefore can be used for high temperature fluid.

Moreover, the seal members 14, 16 are axially supported in a space corresponding to the thicknesses of the flange portions 14b, 16b. So, by thinning at least one of the flange portion 14b and the flange portion 16b, it is possible to save the space of the support portion.

Embodiment 3

Figure 6:
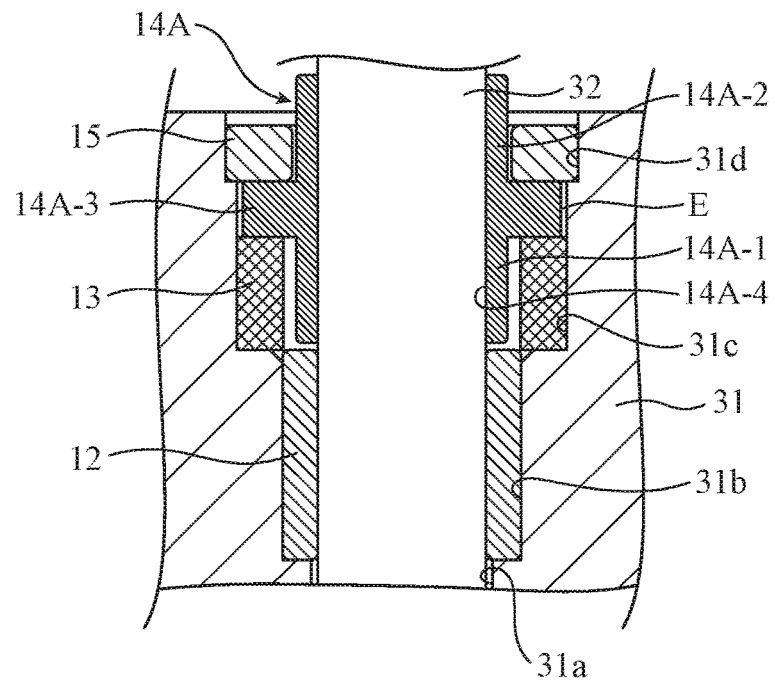
FIG. 6 is an enlarged cross-sectional view of a seal structure of a fluid control valve in accordance with Embodiment 3.
Figure 7:
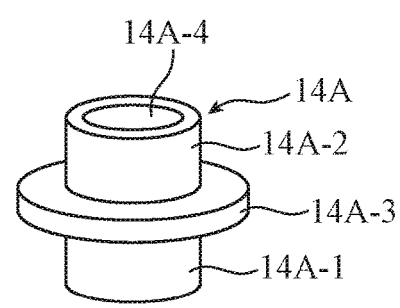
FIG. 7 is a perspective view of a seal member shown in FIG. 6.

FIG. 6 is an enlarged cross-sectional view of a seal structure of a fluid control valve in accordance with Embodiment 3, and shows a portion corresponding to the portion A illustrated in FIG. 1. FIG. 7 is a perspective view of the seal member shown in FIG. 6. As shown in FIG. 6, in a valve-side-housing 31, there are formed a through-hole 31a and bore portions 31b, 31c, and 31d that communicate with the through-hole 31a.

In the bore portion 31b, there is mounted a bearing bushing 12. Inserted into the bearing bushing 12 is a valve shaft 32, which is rotatably supported by an inner circumferential surface 12a of the bearing bushing 12.

In the bore portion 31c, there are mounted a filter 13 and a seal member 14A.

As shown in FIG. 7, the seal member 14A includes a cylindrical portion 14A-1, a flange portion 14A-3 extending radially outward from one end of the cylindrical portion 14A-1, and another cylindrical portion 14A-2 extending axially from the one end of the cylindrical portion 14A-1. Inside the cylindrical portions 14A-1, 14A-2, there is formed a through-hole 14A-4.

Note that the seal member 14A corresponds to a seal member which is integrally formed of both the seal members 14, 16 explained in Embodiment 2.

In the bore portion 31c, the seal member 14A is disposed in such a manner that the cylindrical member 14A-1 is disposed radially inward of the filter 13, that the cylindrical member 14-2 is disposed radially inward of the plug 15, and that the flange portion 14A-3 is disposed on the filter 13. In addition, the valve shaft 32 is inserted into the through-hole 14A-4 of the cylindrical portions 14A-1, 14A-2.

As in Embodiment 1, by press-fitting the plug 15 within the bore portion 31d, the filter 13 and the seal member 14A are supported.

Note that the filter 13 has such a dimension along an axial direction of the valve shaft that the flange portion 14A-3 is projected in the bore portion 31d before the plug 15 is placed in the bore portion 31d. That is, when the plug 15 is press-fitted in the bore portion 31d, the filter 13 is pushed by the plug 15 via the flange portion 14A-3. On the other hand, the flange portion 14A-3 receives a reaction force from the filter 13 because the filter 13 tries to return to its original shape after pushed by the plug 15. By this reaction force, the flange portion 14A-3 is supported between the filter 13 and the plug 15 in a state in which the flange portion 14A-3 is pressed against the plug 15. Thus, a portion where the flange portion 14A-3 is pressed against the plug 15 serves as a seal portion that prevents the leakage of the exhaust gas. In addition, since only the flange portion 14A-3 of the seal member 14A is supported between the filter 13 and the plug 15, it is possible to save space of a support portion by thinning the flange portion 14A-3.

In addition to the seal portion described above, the seal member 14A prevents the gas leakage by gas flow resistivity, which is determined by axial lengths of the cylindrical portions 14A-1, 14A-2 and a clearance between a surface defining the through-hole 14A-4 and the valve shaft 32.

While a minimum clearance that provides no tightening is provided between the inner wall of the through-hole 14A-4 and the valve shaft 32, the cylindrical portions 14A-1, 14A-2 can be elongated axially regardless of thickness of the flange portion 14A-3. Therefore, it is possible to achieve sufficient gas flow resistivity at the cylindrical portions 14A-1, 14A-2, and provide high sealing performance.

Note that an axial length of the cylindrical portion 14A-1 of the seal member 14A may be the same as an axial length of the cylindrical portion 14A-2 of the seal member 14A. In this case, a total axial length of the cylindrical portions becomes two times longer than the axial length of the cylindrical portion according to Embodiment 1. Thus, the gas flow resistivity is increased.

Alternatively, if no components are located axially close to the plug 15, the seal member 14A may have a longer cylindrical portion 14A-2 than the cylindrical portion 14A-1.

Thereby, the gas flow resistivity at the cylindrical portions 14A-1, 14A-2 is further increased and the sealing performance are improved.

Further, assuming that the seal member 14A is completely fixed to the bore portion 31c, there is a possibility that the rotation of the valve shaft 32 is obstructed when the valve shaft 32 comes into contact with the inner wall of the through-hole 14A-4 during the operation of the EGR valve.

Accordingly, as shown in FIG. 6, a diameter of the flange portion 14A-3 is determined such that a clearance E is provided between the flange portion 14A-3 and an inner wall of the bore portion 31c. Thereby, the seal member 14A can move in a plane perpendicular to the axial direction of the valve shaft together with the valve shaft 32 by the distance defined by the clearance E, while the flange portion 14A-3 is axially pushed against the plug 15. Consequently, the above-mentioned obstruction problem is not likely to occur.

As described above, according to Embodiment 3, the seal member 14A includes the cylindrical portion 14A-1, the flange portion 14A-3 extending radially outward from one end of the cylindrical portion 14A-1, and the cylindrical portion 14A-2 extending axially from the end of the cylindrical portion 14A-1. Further, the valve shaft 32 is inserted into both the cylindrical portion 14A-1 and the cylindrical portion 14A-2. Moreover, the flange portion 14A-3 is supported between the filter 13 and the plug 15 in a state in which the flange portion 14A-3 is pressed against the plug 15.

Thus, the seal structure of the fluid control valve according to Embodiment 3 can be achieved with the seal member 14A having a simple configuration. In addition, in Embodiment 3, the number of components of the fluid control valve can be reduced as compared to Embodiment 2.

In addition, the seal member 14A can prevent the leakage of the fluid at the portion where the flange portion 14A-3 is pressed against the plug 15, and by the gas flow resistivity at the cylindrical portions 14A-1, 14A-2.

Thus, the seal member need not be elastically deformable to secure the sealing performance, and therefore can be used for high temperature fluid.

Moreover, the seal member 14A is axially supported in a space corresponding to the thicknesses of the flange portion 14A-3. So, by thinning the flange portion 14A-3, it is possible to save the space of the support portion.

Embodiment 4

Figure 8:
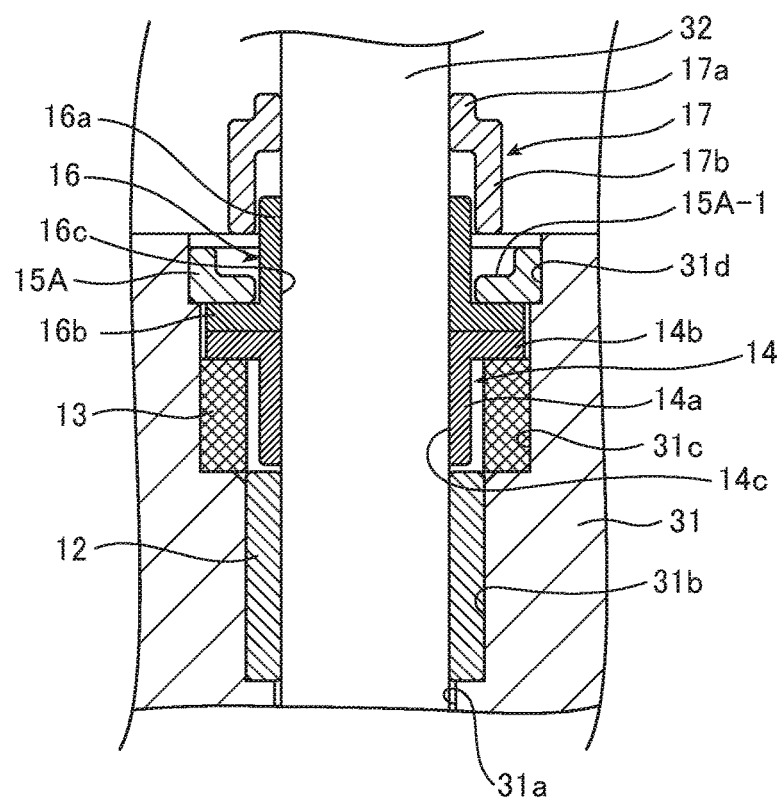
FIG. 8 is an enlarged cross-sectional view of a seal structure of a fluid control valve in accordance with Embodiment 4.
Figure 9:
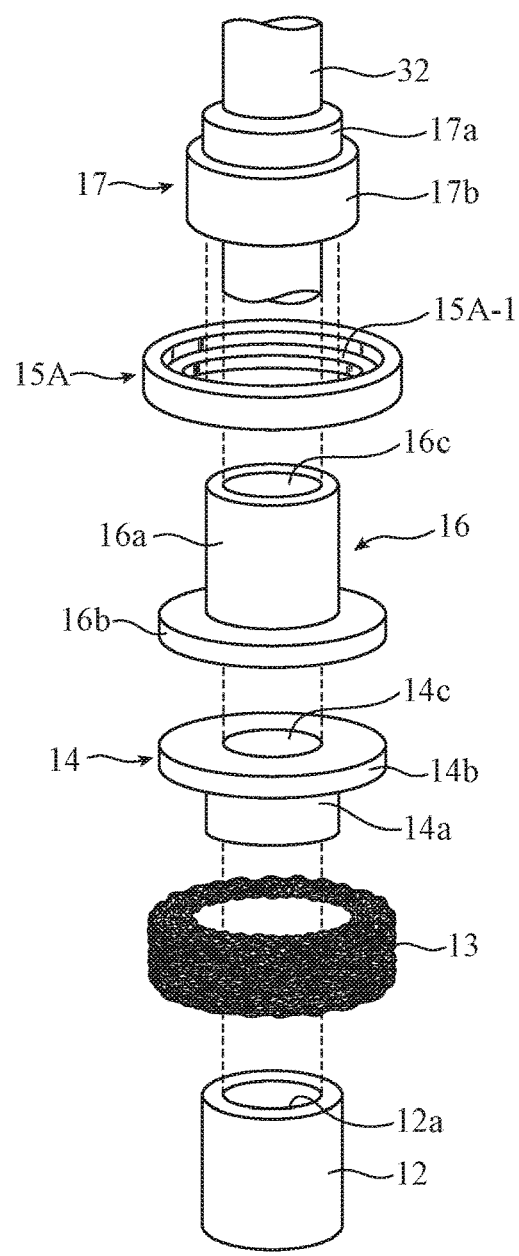
FIG. 9 is an exploded perspective view of the seal structure in accordance with Embodiment 4.

FIG. 8 is an enlarged cross-sectional view of a seal structure of a fluid control valve in accordance with Embodiment 4, and shows a portion corresponding to the portion A illustrated in FIG. 1. FIG. 9 is an exploded perspective view of the seal structure in accordance with Embodiment 4, and shows members that constitute the seal structure shown in FIG. 8. The seal structure shown in FIG. 8 is comparable to that explained in Embodiment 2 with the addition of a cover 17.

The cover 17 is an example of a cover member in this disclosure. The cover 17 is a cylindrical member having a small diameter portion 17a, which has a small inner diameter, and a large diameter portion 17b, which has a large inner diameter. The small diameter portion 17a is fixed (press-fitted) to the valve shaft 32. As shown in FIG. 8, the large diameter portion 17b covers an end portion of the cylindrical portion 16a extending beyond the plug 15 from the flange portion 16b. Covering the end portion of the cylindrical portion 16a with the large diameter portion 17b of the cover 17 in this way further increases the gas flow resistivity. Thereby, the sealing performance is improved.

Shown in FIGS. 8 and 9 is an example in which the cover 17 is a cylindrical member having two different inner diameters, though the cover 17 may be a cylindrical member whose inner diameter gradually increases from the small diameter portion 17a along the axial direction.

In addition, when the cover 17 is provided, the plug 15A that has a shape with a depression along the axial direction at the inner side of the plug may be used as shown in FIG. 8.

To entirely cover the end portion of the cylindrical portion 16a with the cover 17, it is necessary to extend the peripheral wall of the large diameter portion 17b toward the cylindrical portion 16a. In this case, if the plug 15 explained in any one of Embodiments 1 to 3 is used, the plug 15 is likely to interfere with the peripheral wall of the large diameter portion 17b.

By contrast, the depression 15A-1 of the plug 15A can accommodate a part of the peripheral wall of the large diameter portion 17b extending toward the cylindrical portion 16a. Thus, it is possible to avoid the interference between the plug and the peripheral wall of the large diameter portion 17b.

In this embodiment, the example in which the cover 17 is added to the configuration according to Embodiment 2 is described. Usage of the cover 17 is not limited to the case of Embodiment 2. For example, the cover may be added to the configuration according to Embodiment 1, in which the cylindrical portion 14a of the seal member 14 is disposed on the side of the plug 15. Further, the cover may be added to the configuration according to Embodiment 3 to cover the seal member 14A. In these cases, the same or similar effect can be obtained.

As described above, according to Embodiment 4, the cover 17 covers the end portion of the cylindrical portion 16a extending beyond the plug 15 from the flange portion 16b. Thereby, the gas flow resistivity is further increased and high sealing performance are achieved.

In Embodiments 1 to 4, the butterfly valve is exemplified as the fluid control valve. However, the fluid control valve is not limited to the butterfly valve. The fluid control valve can also be applied to, for example, a poppet valve whose valve shaft is linearly movable to open or close the valve.

Note that combination, modification or omission of parts of embodiments described above may be made within the scope of the invention.

INDUSTRIAL APPLICABILITY

Because the fluid control valve according to this disclosure has a simple configuration and can prevent the leakage of the fluid at a high temperature, the fluid control valve according to this disclosure can be preferably applied to, for example, the exhaust gas recirculation valve that deals with the exhaust gas having high temperature.

REFERENCE SIGNS LIST 10 actuator unit, 11 motor, 12 bearing bushing, 12a inner circumferential surface, 13 filter, 14, 14A, 16 seal member, 14a, 14A-1, 14A-2, 16a cylindrical portion, 14b, 14A-3, 16b flange portion, 14c, 14A-4, 16c, 31a through-hole, 15, 15A plug, 15A-1 depression, 17 cover, 17a small diameter portion, 17b large diameter portion, 20 driving force transmitting unit, 21 actuator-side-housing, 22 bolt, 30 valve unit, 31 valve-side-housing, 31b to 31d bore portion, 32 valve shaft, 33 valve.

The invention claimed is:

1. A fluid control valve comprising:
a housing including a fluid passage;
a valve provided in the housing and configured to open or close the fluid passage;
a valve shaft for supporting the valve;
a filter member disposed around the valve shaft and configured to filter fluid from the fluid passage;
a plug member disposed axially opposite the filter member; and
a seal member having a steel sealing surface and having a cylindrical portion, and a flange portion extending radially outward from one end of the cylindrical portion, wherein
the valve shaft is inserted in the cylindrical portion, and
the flange portion of the seal member including the steel sealing surface is directly supported by and contacting the filter member and the plug member in a state in which the flange portion is pressed against the plug member.

2. The fluid control valve according to claim 1, wherein the cylindrical portion of the seal member is disposed on a side of the filter member.

3. The fluid control valve according to claim 1, wherein the cylindrical portion of the seal member is disposed on a side of the plug member.

4. A fluid control valve comprising:
a housing including a fluid passage;
a valve provided in the housing and configured to open or close the fluid passage;
a valve shaft for supporting the valve;
a filter member disposed around the valve shaft and configured to filter fluid from the fluid passage;
a plug member disposed axially opposite the filter member;
a first seal member having a first cylindrical portion, and a first flange portion extending radially outward from one end of the first cylindrical portion; and
a second seal member having a second cylindrical portion, and a second flange portion extending radially outward from one end of the second cylindrical portion, wherein
the valve shaft is inserted in both the first and second cylindrical portions,
the first cylindrical portion of the first seal member is disposed on a side of the filter member,
the second cylindrical portion of the second seal member is disposed on a side of the plug member, and
the first flange portion of the first seal member and the second flange portion of the second seal member are supported between the filter member and the plug member in a state in which the second flange portion of the second seal member is pressed against the plug member.

5. The fluid control valve according to claim 4, further comprising a cover member provided to the valve shaft and covering an end portion of the second cylindrical portion, the second cylindrical portion extending axially from the second flange portion toward and beyond the plug member.

6. A fluid control valve comprising:
a housing including a fluid passage;
a valve provided in the housing and configured to open or close the fluid passage;
a valve shaft for supporting the valve;
a filter member disposed around the valve shaft and configured to filter fluid from the fluid passage;
a plug member disposed axially opposite the filter member; and
a seal member having a steel sealing surface and having a first cylindrical portion, a flange portion extending radially outward from one end of the first cylindrical portion, and a second cylindrical portion extending axially from the one end of the first cylindrical portion, wherein
the valve shaft is inserted in both the first and second cylindrical portions,
the flange portion of the seal member including the steel sealing surface is directly supported by and contacting the filter member and the plug member in a state in which the flange portion is pressed against the plug member.

* * * * *